J. H. NEAL.
SAFETY DEVICE FOR AUTOMOBILES.
APPLICATION FILED MAY 20, 1916.

1,204,375.

Patented Nov. 7, 1916.
3 SHEETS—SHEET 1.

Inventor
James H. Neal
By Jas. H. Churchill
Attorney

J. H. NEAL.
SAFETY DEVICE FOR AUTOMOBILES.
APPLICATION FILED MAY 20, 1916.
1,204,375.
Patented Nov. 7, 1916.
3 SHEETS—SHEET 2.
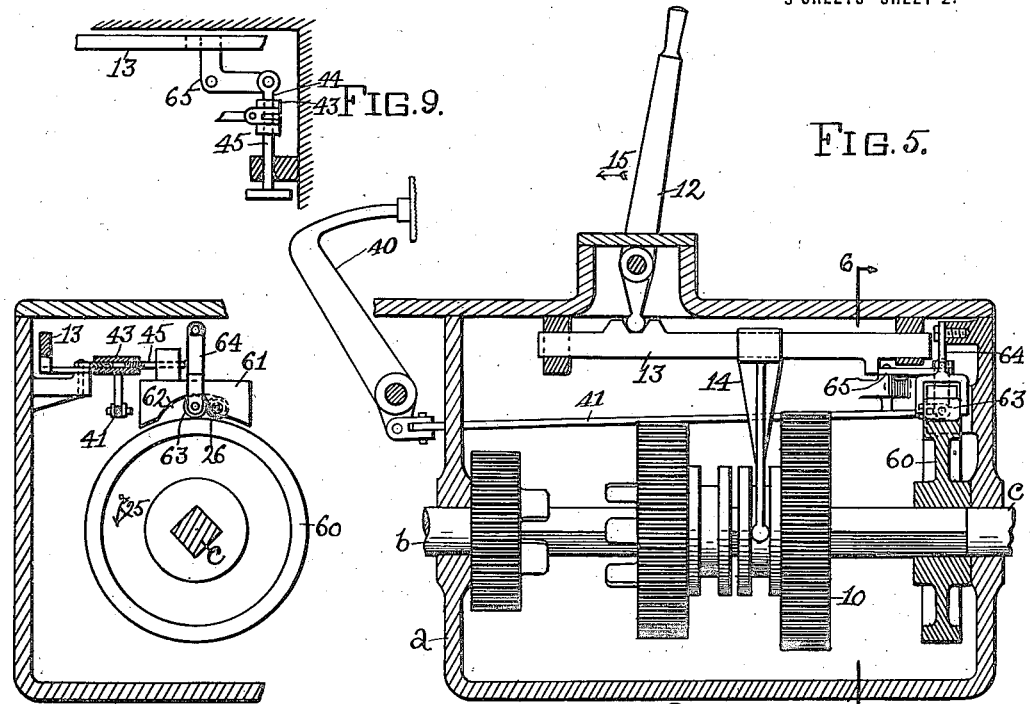
FIG. 9.
FIG. 5.
FIG. 6.
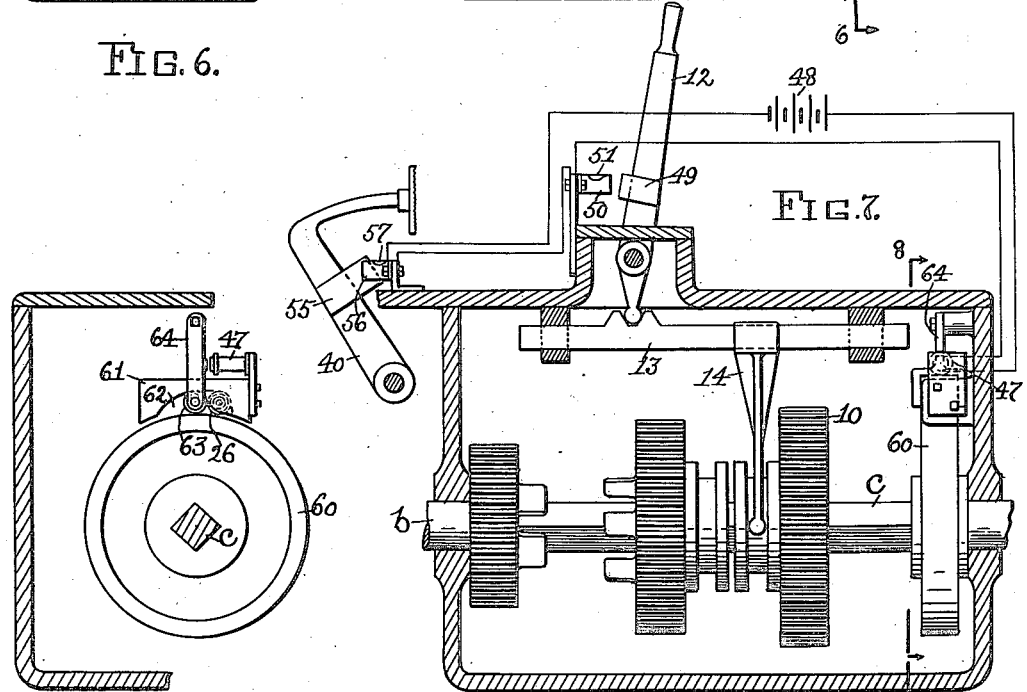
FIG. 7.
FIG. 8.
Inventor
James H. Neal
By Jas. H. Churchill
Attorney

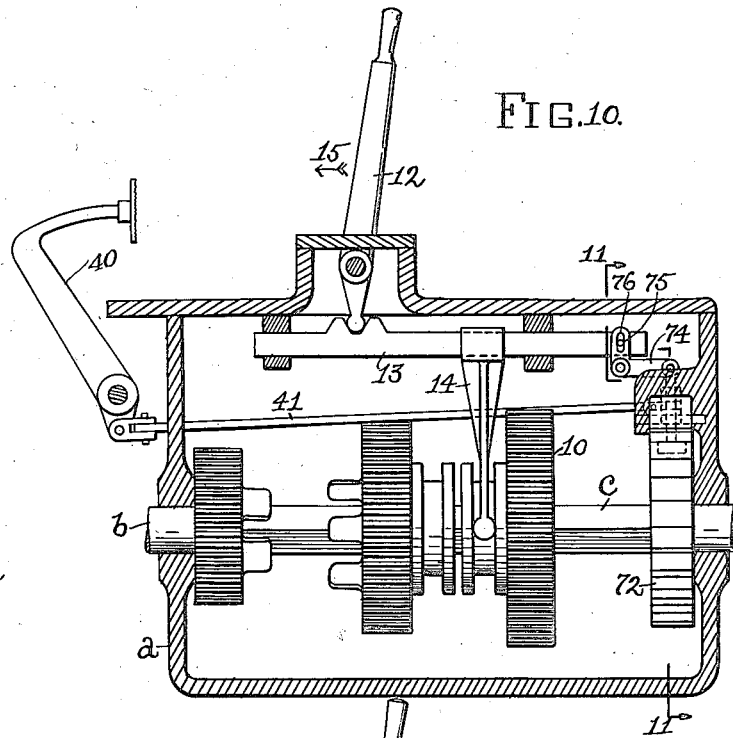
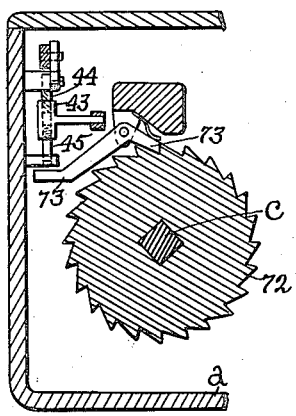
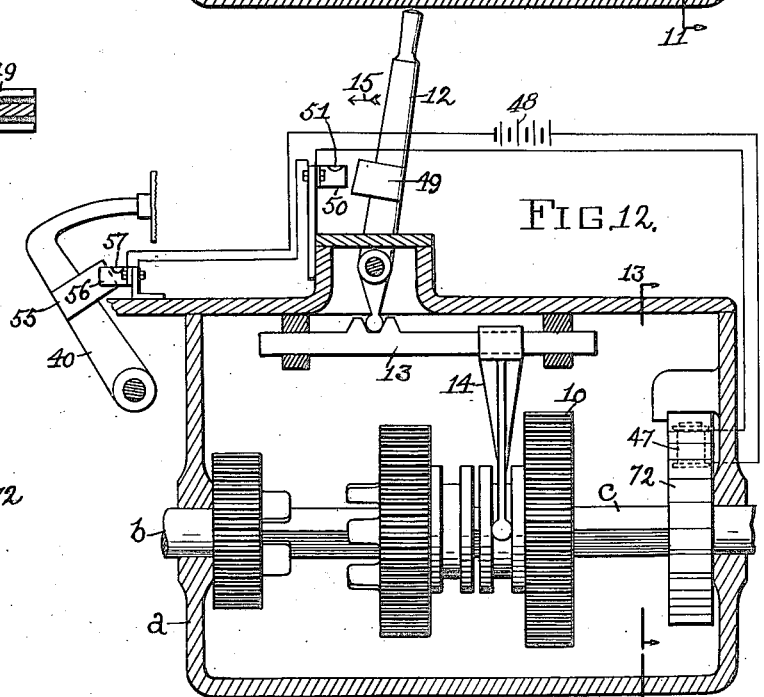
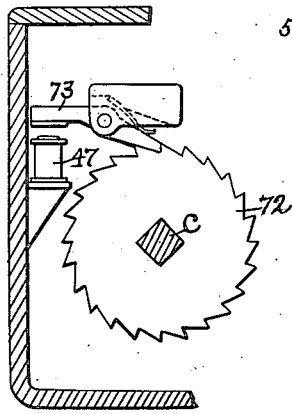

UNITED STATES PATENT OFFICE.

JAMES H. NEAL, OF CAMBRIDGE, MASSACHUSETTS.

SAFETY DEVICE FOR AUTOMOBILES.

1,204,375.

Specification of Letters Patent.

Patented Nov. 7, 1916.

Application filed May 20, 1916. Serial No. 98,999.

*To all whom it may concern:*

Be it known that I, JAMES H. NEAL, a citizen of the United States, residing in Cambridge, in the county of Middlesex and State of Massachusetts, have invented an Improvement in Safety Devices for Automobiles, of which the following description, in connection with the accompanying drawings, is a specification, like characters on the drawings representing like parts.

This invention relates to motor vehicles having wheels and provided with a safety device for arresting unexpected or undesired reverse movement of the vehicle, which safety device is associated with the lever or other device, which controls the direction of movement of the vehicle, so as to render the safety device inoperative when the operator moves the controlling device or lever to effect a desired reverse movement of the vehicle.

The present invention has for its object to provide a vehicle equipped as described, with means for restoring the safety device to its operative condition or position with the control lever or device in its reversing position, and in the present instance the restoring device is operatively connected with the device which controls the application of the motive power to the vehicle, which latter device is the clutch lever commonly employed on vehicles provided with an internal combustion motor, which latter is coupled with the driving mechanism of the vehicle by means of a clutch usually operated by the foot of the driver of the vehicle.

The restoring device is operatively connected with the safety device, so that when the control lever or device is in its reverse position and the clutch is in to apply power to the vehicle, the safety device is inoperative, and so that, when the control lever is in its reverse position and the clutch is out to cut out the power, the safety device is operative to arrest reverse movement of the vehicle.

These and other features of this invention will be pointed out in the claims at the end of this specification.

Figure 2:
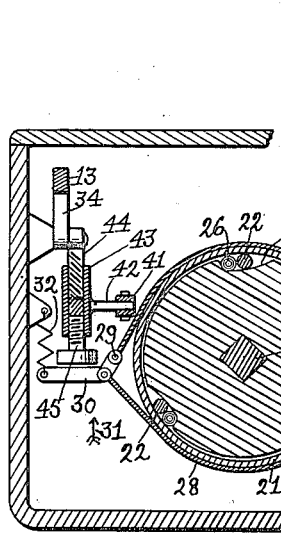
Figure 1:
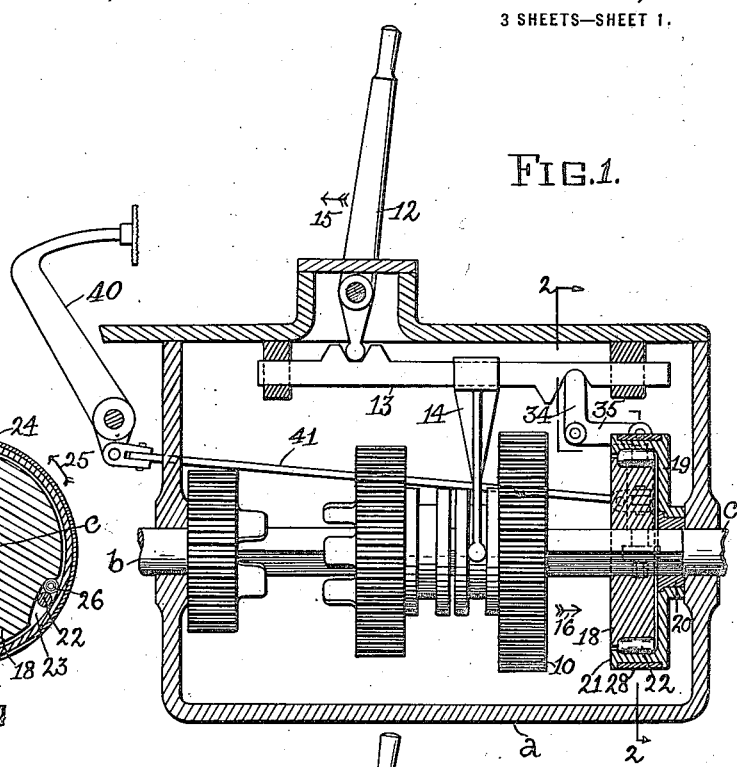
Figure 4:
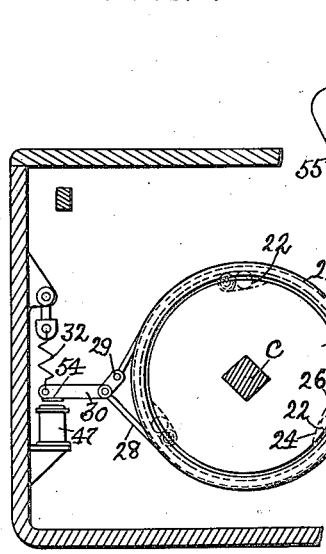
Figure 3:
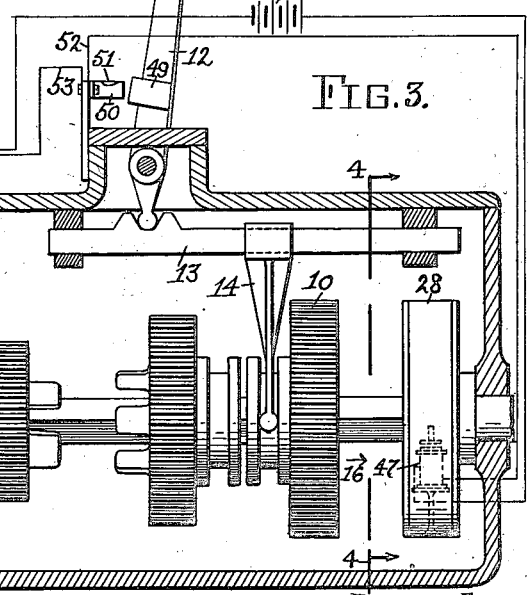

Figure 1 represents a sufficient portion of a motor vehicle embodying this invention to enable it to be understood. Fig. 2, a section on the line 2—2, Fig. 1. Figs. 3 and 4, views like Figs. 1 and 2, showing an electrically operated safety device instead of a mechanically operated one. Figs. 5 and 6, views like Figs. 1 and 2, showing a different form of mechanically operated safety device. Figs. 7 and 8, views like Figs. 5 and 6, showing the safety device illustrated in Figs. 5 and 6 electrically operated. Fig. 9, a detail to be referred to. Figs. 10 and 11, views like Figs. 1 and 2, showing another form of safety device. Figs. 12 and 13, views like Figs. 10 and 11 showing the safety device electrically operated, and Fig. 14, a detail of one form of circuit controller to be referred to.

Inasmuch as the motor vehicle having wheels is well known and its construction well understood, it has been deemed unnecessary to illustrate the construction as a whole, but only sufficient of the same to enable the present invention to be clearly understood. In the present instance, the motor vehicle may be considered as of the type now commonly in use in which a transmission is employed between the motor and the rear wheels, and said motor vehicle is herein represented by such transmission, which comprises the box or casing $a$ and the gearing which operatively connects the shaft $b$ of the prime mover or motor with the shaft $c$ forming part of the driving mechanism for the rear axles of the vehicle.

Inasmuch as the present invention relates to a motor vehicle having a safety device for arresting unexpected or undesired reverse movement of the motor vehicle, which safety device is associated or arranged with relation to the lever or device for controlling the direction of movement of the vehicle, so that, when the control lever or device is moved into its reversing position by the operator, the safety device is rendered inoperative, I have illustrated only a portion of the transmission mechanism, so as to show the relation of the safety device to the control lever, and the gear which effects the desired reverse movement of the vehicle.

Referring to Fig. 1, 10 represents the reverse gear of the transmission, which is operatively connected with the control lever 12, through the sliding bar 13 and arm 14, so that when the control lever 12 is moved by the operator in the direction of the arrow 15, the sliding bar 13 and arm 14 will move the gear 10 in the direction of arrow 16 and cause the reverse gear to engage the proper gear in the transmission casing $a$ and not shown, to effect reverse rotation of the driven shaft $c$ and the rear wheels of the motor vehicle. The driven shaft $c$ is provided with a safety device for arresting unexpected or undesired reverse movement of the vehicle, and in Figs. 1 and 2, I have shown one form of safety device, which consists of a disk 18 mounted on the shaft $c$ to rotate therewith, a second disk 19 loose on a hub 20 fast on the shaft $c$ and provided with a rim 21, which overlaps the disk 18 and is adapted to be automatically coupled thereto by clutch rollers 22 located in recesses 23 in the periphery of the disk 18, said recesses having inclined bottom walls 24, which cause the rollers 22 to grip the rim 21 to the disk 18, when the latter is moved in the direction of the arrow 25, Fig. 2.

The recesses 23 may and preferably will contain springs 26 to center the rollers 22.

The rim 21 has coöperating with it a brake band 28, having one end anchored to a stationary pin 29 and having its other end connected with a lever 30, which is pivotally mounted on the pin 29. The lever 30 is normally moved upwardly in the direction of arrow 31 by a spring 32, so as to cause the band 28 to grip the rim 21 and hold it stationary. The rim 21 is thus held stationary by the band 28 while the control lever 12 is in neutral or any of its positions to effect movement of the vehicle in a forward direction.

The safety device is associated or arranged with relation to the control lever 12, so that when the operator desires to reverse the movement of the vehicle, the safety device is rendered inoperative. This is mechanically effected in Figs. 1 and 2 by means of an elbow lever 34, which has one arm engaged with the sliding bar 13 and its other arm 35 connected to a device which is designed to engage the lever 30 and turn it on its pivot, so as to loosen the band 28 and thereby permit the rim 21 to be clutched to the disk 18, so as to move as one piece therewith when the disk 18 is rotated in the direction of the arrow 25, Fig. 2, and thus permit the vehicle to be reversed at the will of the operator.

It will thus be seen that as thus far described, the safety device is rendered inoperative when the control lever 12 is in its reversing position.

The present invention has for its object to provide means for restoring the safety device to its operative condition at the will of the operator with the control lever in its reversing position, and thereby provide against accidents in case of confusion on the part of the operator.

To illustrate: Let it be supposed that the operator is reversing the vehicle, as for instance, in turning around on an incline road, which is narrow, and runs off abruptly at the side, and suppose that the operator makes a miscalculation and feels the rear wheels going down into the gutter or gully, his natural impulse is to immediately operate the control mechanism so as to drive the vehicle forward and thus get himself out of a dangerous position. In order to shift his control lever into a position to move the vehicle forward, it is necessary to first throw off the power, which is effected in motor vehicles provided with transmission gears by throwing out the clutch, and therefore the natural impulse of the operator is to apply his foot to the clutch lever so as to throw out the clutch, and to take advantage of this natural impulse, I have operatively connected the safety device with the clutch lever, so that when the clutch is thrown out with the control lever in its reversing position, the safety device is restored to its operative condition and becomes effective to arrest backward movement of the vehicle.

In Fig. 1, I have illustrated a mechanical restoring device for effecting the desired result, and to this end, the clutch lever, which is represented by the lever 40, is connected by a link or rod 41 with an arm 42 on an internally threaded sleeve 43, which is in threaded engagement with two threaded rods 44, 45, which operatively connect the elbow lever 34 with the band lever 30.

The parts of the restoring device are constructed and arranged so that, when the clutch lever 40 is moved to throw out the clutch, the sleeve 43 is turned on the threaded rod 44 and the threaded rod 45 is lifted out of engagement with the band lever 30, which permits the spring 32 to raise the lever 30 and tighten the band 28 on the rim 21, thereby holding the latter stationary and arresting further reverse movement of the vehicle, for as the disk 18 is turned in the direction of the arrow 25, Fig. 2, it will be seen that the rollers 22 will clutch the disk 18 to the now stationary rim 21, and prevent further reverse movement of the vehicle, notwithstanding the fact that the control lever 12 may be in its reversing position. When the control lever 12 is in neutral or in any of its forward positions, the restoring device is in a position where it is inoperative upon the safety device, for by reference to Figs. 1 and 2, it will be seen that when the control lever 12 is in neutral, the rod 45 is out of engagement with the lever 30.

In Figs. 1 and 2, I have shown a mechanical device for restoring the safety device to its operative condition, when the control lever is in its reversing position, and in Figs. 3 and 4, I have shown a restoring device, which coöperates with an electrically operated safety device. In this case, the band 28 is slackened by means of an electromagnet 47, which is included in a circuit containing a source of current, shown as a battery 48 and a circuit controller comprising as shown, a movable contact member 49 carried by the control lever 12, and stationary contact members 50, 51, shown separately in Fig. 14, to which are connected the circuit wires 52, 53, including the battery 48 and electromagnet 47. The circuit controller 49, 50, 51, is open when the control lever is in neutral or in any of its positions to effect forward movement of the vehicle, and when the circuit is open the electromagnet 47 is deënergized, and the band 28 is tightened by the spring 32 so as to render the safety device inoperative.

When the control lever 12 is moved into its reverse position, the circuit of the magnet 47 is closed by the contact member 49 being engaged with the contact members 50, 51, and the magnet attracts its armature 54 carried by the lever 30, and moves the latter so as to slacken off the band 28 and thereby render the safety device inoperative.

To restore the safety device to its operative condition, with the control lever 12 in its reversing position, I have provided the circuit of the electromagnet 47 with a second circuit controller having a movable member 55 carried by the clutch lever 40 and coöperating with contact members 56, 57, which are included in the circuit of the electromagnet 47 in series with the controller 49, 50, 51.

When the clutch is in, the contact member 55 engages the contact members 56, 57, and the circuit of the magnet 47 is closed at this point, and when the control lever 12 is in its reversing position, the circuit is closed at the control lever, consequently the magnet 47 is energized and the safety device is rendered inoperative. If the operator throws out his clutch, with the control lever in its reversing position, the circuit of the magnet 47 is opened at the clutch lever, and the said magnet is deënergized, thereby allowing the spring 32 to tighten the band 28 and again render the safety device operative to arrest backward movement of the vehicle.

In Figs. 5 and 6, I have shown the mechanical restoring device shown in Figs. 1 and 2, as associated with a different construction of mechanically operated safety device, which latter consists of a disk or wheel 60 fast on the shaft $c$, a stationary member 61 having a recess which contains a clutch roller 63 carried by a lever 64 with which the threaded rod 45 of the restoring device coöperates.

The threaded rod 44 is pivoted to an elbow lever 65, which is engaged with the sliding bar 13. The threaded sleeve 43 has its arm 42 connected by the link 41 with the clutch lever 40. With the construction shown in Figs. 5 and 6, unexpected reverse movement of the disk 60 causes the clutch roller 63 to be wedged against the stationary member 61, so as to arrest reverse movement of the vehicle. When the control lever 12 is moved into its reversing position, the rod 45 is engaged with the lever 64 and the clutch roller 63 is moved into position to permit the disk 60 to revolve freely in the direction of arrow 25, Fig. 6. When the control lever 12 is in its reversing position, and the clutch lever 40 is moved to throw out the clutch, the sleeve 43 is turned so as to withdraw the rod 45 from engagement with the lever 64 and permit the spring 26 to move the clutch roller 63 into its central position, from which it is carried by the disk 60 into its wedging or holding position.

In Figs. 7 and 8, the lever 64 carrying the clutch roller is shown as moved into its inoperative position by the electromagnet 47, which is included in circuit with the battery 48, and the circuit controllers associated with the control lever 12 and clutch lever 40 and the operations of these circuit controllers is the same as that described with relation to the circuit controllers shown in Fig. 5.

In Figs. 10 and 11, I have illustrated the mechanical restoring device 43, 44, 45, as associated with another mechanically constructed safety device, which consists of a ratchet wheel 72 fast on the shaft $c$ and a pawl 73 coöperating therewith. In this case, the threaded rod 44 of the restoring device is connected with an elbow lever 74, which has a pin and slot connection 75, 76, with the sliding bar 13 operated by the control lever 12, and when the latter is moved into its reversing position, the rod 45 of the restoring device engages the pawl 73 and lifts the latter out of engagement with the ratchet wheel 72. If the clutch lever 40 is thrown out with the control lever 12 in its reversing position, the sleeve 43 is turned so as to withdraw the rod 45 from engagement with the pawl 73 and allow the latter to be engaged with the ratchet wheel so as to arrest reverse movement of the vehicle.

In Figs. 12 and 13, the pawl 73 is shown as disengaged by an electromagnet 47, whose action is controlled in the same manner as described with reference to Figs. 3 and 7.

From the above description, it will be seen that a motor vehicle, such as the ordinary motor truck or pleasure automobile, when equipped in accordance with my invention, is safeguarded against accidents, which result in many cases from the operator becoming confused.

While I have herein shown the restoring device as connected with the clutch lever, it is not desired to limit the invention in this respect.

In the present instance, the restoring device is shown as coöperating with a safety device located in the transmission casing, but it is not desired to limit the invention in this respect. Furthermore it is not desired to limit the invention to the particular construction of restoring device herein shown.

I claim:

1. The combination with a motor vehicle provided with wheels and with means for reversing the movement of said vehicle, of a safety device rendered effective by reverse movement of the vehicle to prevent continued movement in the reverse direction, means actuated by said reversing means for rendering said safety device inoperative to permit reversal of the vehicle at the will of the operator, and means for restoring said safety device to its operative condition with the said reversing means in its reversing position.

2. The combination with a motor vehicle provided with wheels and with a device for controlling the speed of the vehicle, and with a device for controlling the application of the motive power to the rear wheels of the vehicle, of a safety device rendered effective by the reverse movement of the vehicle to prevent continued movement in the reverse direction, means for operatively connecting said safety device with said speed controlling device to enable said safety device to be rendered inoperative when the speed controlling device is actuated to effect reversal of the vehicle at the will of the operator, and means operatively connected with the power applying device for restoring said safety device to its operative condition with the speed controlling device in its reversing position.

3. The combination with a motor vehicle provided with wheels, and with means for reversing the movement of said vehicle, of a safety device rendered effective by reverse movement of the vehicle to prevent continued movement in the reverse direction, means actuated by said reversing means for rendering said safety device inoperative to permit reversal of the vehicle at the will of the operator, and means separate from said reversing means for restoring said safety device to its operative condition.

In testimony whereof, I have signed my name to this specification.

JAMES H. NEAL.